United States Patent
Tang et al.

(10) Patent No.: US 7,457,257 B2
(45) Date of Patent: Nov. 25, 2008

(54) APPARATUS, SYSTEM, AND METHOD FOR RELIABLE, FAST, AND SCALABLE MULTICAST MESSAGE DELIVERY IN SERVICE OVERLAY NETWORKS

(75) Inventors: Chunqiang Tang, Ossining, NY (US); Rong Nickle Chang, Pleasantville, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 11/281,792

(22) Filed: Nov. 17, 2005

(65) Prior Publication Data

US 2007/0110063 A1 May 17, 2007

(51) Int. Cl.
*H04L 12/28* (2006.01)
(52) U.S. Cl. .................... 370/256; 370/390; 370/408; 370/432; 709/220; 709/238; 709/252
(58) Field of Classification Search .................. None
See application file for complete search history.

(56) References Cited

U.S. PATENT DOCUMENTS

| | | | |
|---|---|---|---|
| 6,611,872 B1 * | 8/2003 | McCanne | 709/238 |
| 6,980,518 B1 * | 12/2005 | Sun et al. | 370/235 |
| 7,031,308 B2 * | 4/2006 | Garcia-Luna-Aceves et al. | 370/390 |
| 7,035,937 B2 * | 4/2006 | Haas et al. | 709/239 |
| 7,200,654 B2 * | 4/2007 | Koh et al. | 709/223 |
| 7,379,428 B2 * | 5/2008 | Xu et al. | 370/254 |
| 7,386,606 B2 * | 6/2008 | Massoulie et al. | 709/221 |
| 2004/0190517 A1 * | 9/2004 | Gupta et al. | 370/392 |

* cited by examiner

*Primary Examiner*—Wing F. Chan
*Assistant Examiner*—Brian Roberts
(74) *Attorney, Agent, or Firm*—Lisa M. Yamonaco; Anne Vachon Dougherty

(57) ABSTRACT

A method to organize nodes into an overlay network and to disseminate multicast messages within this overlay both through an efficient tree embedded in the overlay and through gossips exchanged between overlay neighbors. Regardless of the size of the system, this invention incurs a constant low overhead on each node.

4 Claims, 12 Drawing Sheets

APPARATUS, SYSTEM, AND METHOD FOR RELIABLE, FAST, AND SCALABLE MULTICAST MESSAGE DELIVERY IN SERVICE OVERLAY NETWORKS

FIELD OF THE INVENTION

This invention is directed to applications and/or systems that require group communication among a number of distributed computers. More specifically, this invention relates to providing fast and reliable propagation of multicast messages from multiple sources to multiple destinations in a system that may experience frequent machine and/or network failures.

BACKGROUND OF THE INVENTION

With the rapid growth of the Internet, more and more applications are being developed for, or ported to, wide-area networks in order to take advantage of resources available at geographically disparate locations, examples being grids, peer-to-peer data sharing, and computer-supported collaborative work. Group communication efficiently delivers messages to a large number of receivers in a distributed system. Group communication is a mechanism through which a single node can send a message to one or more receivers. In this invention, group communication is also referred to as multicast. Group communication is, therefore, a basic utility for writing distributed applications and can be used for various purposes, including the dissemination of system monitoring events to facilitate the management of distributed systems, and the propagation of updates of shared state to maintain cache consistency.

A dependable group communication protocol for large-scale and delay-sensitive mission critical applications should meet at least the following four basic requirements: (1) reliable message delivery, (2) fast message delivery, (3) scalable performance, and (4) efficient network resource consumption. For reliable message deliver, the system should sustain stable throughput even in the face of frequent packet losses and node failures. Systems that solely optimize for friendly environments are unacceptable. With regard to fast message delivery, messages should be delivered via an efficient path, without undue delay. Many mission critical applications have real-time constraints, e.g., airline control and system monitoring. When a deadline is missed, the message becomes useless. Even within the deadline, the value of the message depreciates over time. As to scalable performance, the system should be self-adaptive to handle dynamic node joins and leaves and, as the system grows, any degradation in efficiency, reliability, and message delay should be graceful. Efficient network resource consumption is desirable so that, when multicasting a message to a large number of receivers at the application level, the load should be balanced across the available links.

Two categories of existing protocols, namely reliable multicast and gossip multicast protocols, have the potential to meet some, but not all of, the requirements above. The "reliable" multicast protocol sends messages through a multicast tree that spans over all receivers and relies on retransmissions of lost messages to handle failures. In a friendly environment, it propagates messages rapidly. Previous study, however, has shown that a small number of disturbed slow nodes can lead to dramatically reduced throughput for the entire system. Reliable multicast, therefore, is not a scalable solution for dependable group communication. Using "gossip" multicast protocol, nodes periodically choose some random nodes to propagate summaries of message IDs (so-called "gossips") and to pick up missing messages heard from other gossips. The redundancy in gossip paths addresses both node and link failures. Gossip multicasting delivers stable throughput even in an adverse environment; however, the propagation of multicast messages can be slower than that in reliable multicasting, since the delay is proportional to the gossip period and exchanging gossips ahead of actual messages incurs extra delay. Moreover, because of their obliviousness to network topology, random gossips in a large system can impose extremely high loads on some underlying network links.

What is needed, and is an object of the present invention, is a group communication mechanism that combines the benefits of reliable multicasting, including topology awareness and fast message propagation, with the benefits of gossip multicasting, namely stable throughput and scalability, while avoiding their limitations. Such a combination would provide reliable, fast, and scalable multicast message delivery in distributed systems even in the face of frequent machine and/or network failures. Another object of the invention is to provide dependable group communication for large-scale mission critical applications that are delay sensitive.

SUMMARY OF THE INVENTION

A method is provided to organize nodes into an overlay network and to disseminate multicast messages within this overlay both through an efficient tree embedded in the overlay and through gossips exchanged between overlay neighbors. Regardless of the size of the system, this invention incurs a constant low overhead on each node. A node join or leave affects only a small number of other nodes in the system, and those nodes handle the change locally. The mechanism in this invention is self-tuning. Its efficiency and message delay improves quickly as more is learned about the underlying physical network. The resulting proximity-aware overlay network has balanced node degrees, wherein a "node's degree" refers to the number of overlay neighbors that a node keeps, which are maintained in a decentralized fashion. The purpose of balancing node degrees is to spread the protocol overhead out across all nodes in the system. The invention further introduces a protocol to control the node degree for each node. The application level links in the overlay consist of links between random neighbors as well as links selected based on network proximity (e.g., network latency). The ratio of random links to proximity-aware links provides the system with fast message propagation as well as sufficient resilience in the face of massive network and/or node failures. On top of this overlay network, an application-level proximity-aware multicast tree is further constructed in a distributed fashion without global knowledge at any single node. The links in the overlay multicast tree are selected from links already in the overlay network. In other words, the overlay multicast tree is embedded in the overlay network.

In accordance with the invention, a multicast message propagates away from the source node that generates the multicast message by following the tree links. When no failure occurs, the multicast message reaches every node in the system by traveling over every link in the efficient application-level multicast tree. In parallel to the message propagation in the tree, the system also runs a special gossip protocol to cope with system failures. In the background, nodes exchange message summaries (gossips) with their overlay neighbors (as opposed to random nodes in an ordinary gossip protocol). Through this special gossip protocol, nodes discover multicast messages that they do not receive, for example message which have been lost due to disruptions in the tree-based multicast, and request those missing messages from their overlay neighbors. The number of times (i.e., redundancy) that a node receives the gossip containing the ID of a message is controlled by the number of the node's overlay neighbors (i.e., node degree). The proposed methods in this invention work at the application-level of a network, requiring (1) no changes to the TCP/IP or UDP/IP protocol stack, (2) no IP-level multicast support from the routers in the Internet infrastructure, and (3) no modifications to the hardware and/or software of routers in the Internet infrastructure.

BRIEF DESCRIPTION OF THE DRAWINGS

Additional features and advantages of this invention will become apparent from the ensuing description which references the appended drawings wherein.

DETAILED DESCRIPTION OF PREFERRED EMBODIMENTS

Figure 1A:
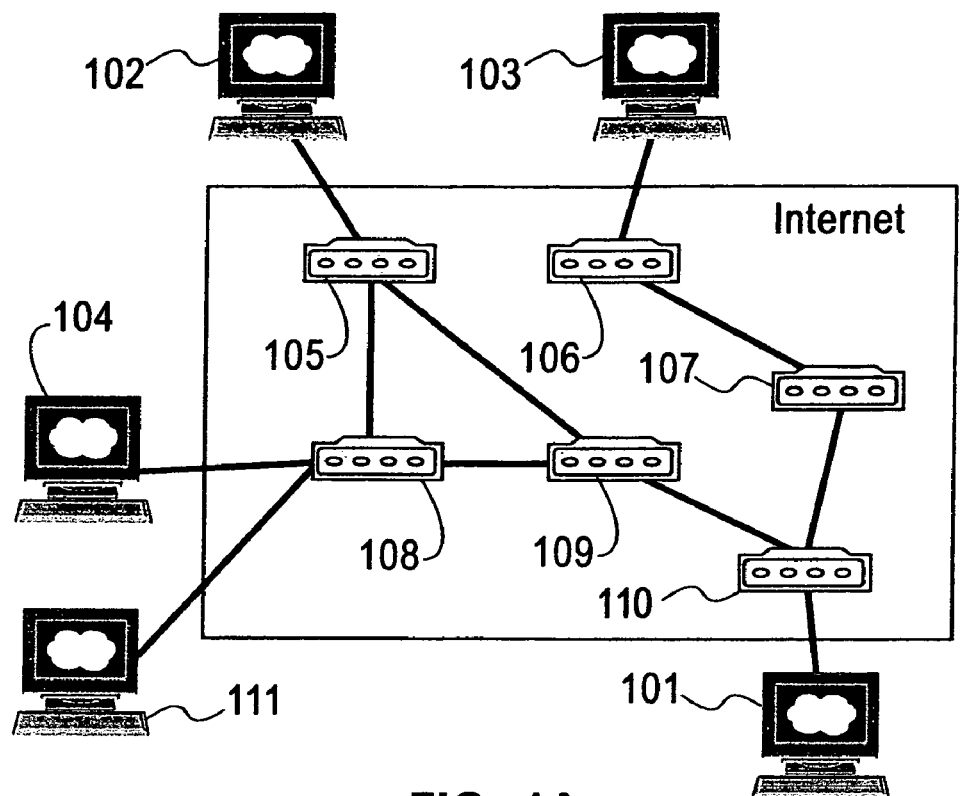
FIGS. 1A and 1B provide diagrams of a representative basic physical network and the logical overlay network.
Figure 1B:
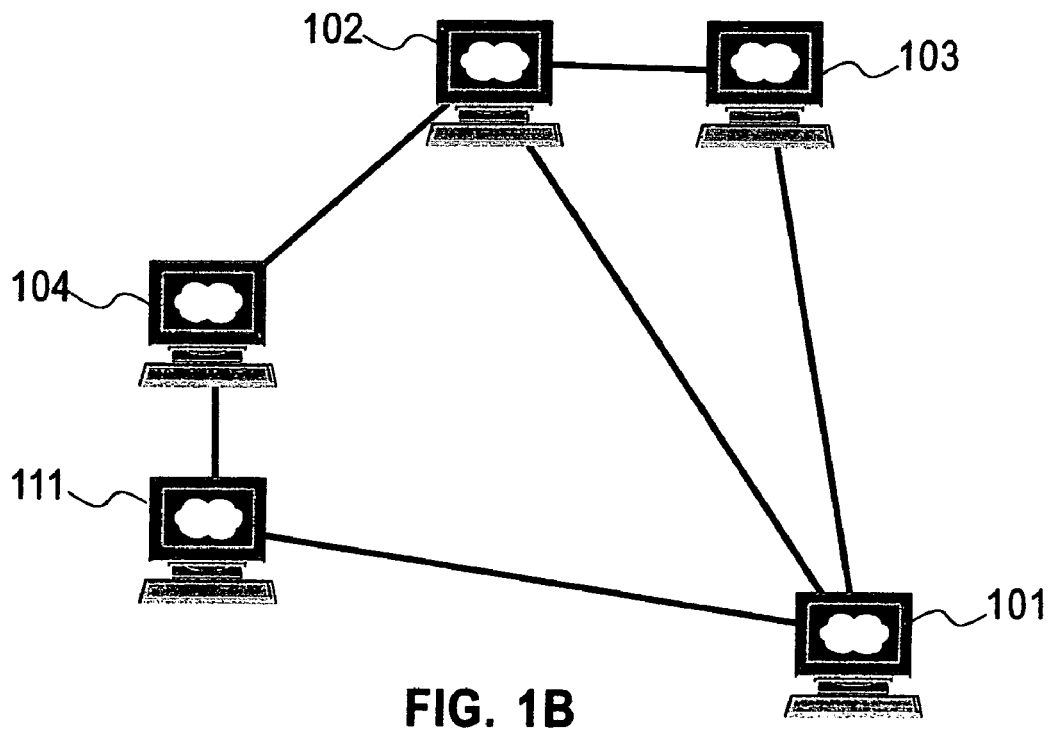

FIGS. 1A and 1B are diagrams of a representative basic physical network and a logical overlay network derived therefrom. The present invention creates and exploits the overlay network. FIG. 1A is a diagram of the physical structure of a network, including computing nodes 101, 102, 103, 104, and 111, routers 105-110, and network links between routers as well as between routers and nodes. Each link in FIG. 1A corresponds to a physical link in the network.

FIG. 1B illustrates a logical overlay network constructed "on top of" the physical network. Each logical link in the logical overlay network may span over several physical links in the physical network. For instance, the link between nodes 102 and 103 in the logical overlay network may travel over multiple physical links in the physical network, including the link from node 102 to router 105, the link from router 105 to router 109, the link from router 109 to router 110, the link from router 110 to router 107, the link from router 107 to router 106 and the link from router 106 to node 103. So long as there exist a path in the physical network that connects two nodes, this invention assumes that an overlay link between these two nodes can always be established through some communication mechanism supported by the physical network, for instance, TCP/IP or UDP/IP. In accordance with this description, the term "overlay link" refers to a logical link in the overlay network, which may span over multiple physical links; and the term "neighbor" for a node X refers to each node that is connected to node X through some overlay link. Therefore, node 102 has neighbors 103, 101 and 104, each of which is connected to node 102 by an overlay link.

Figure 2:
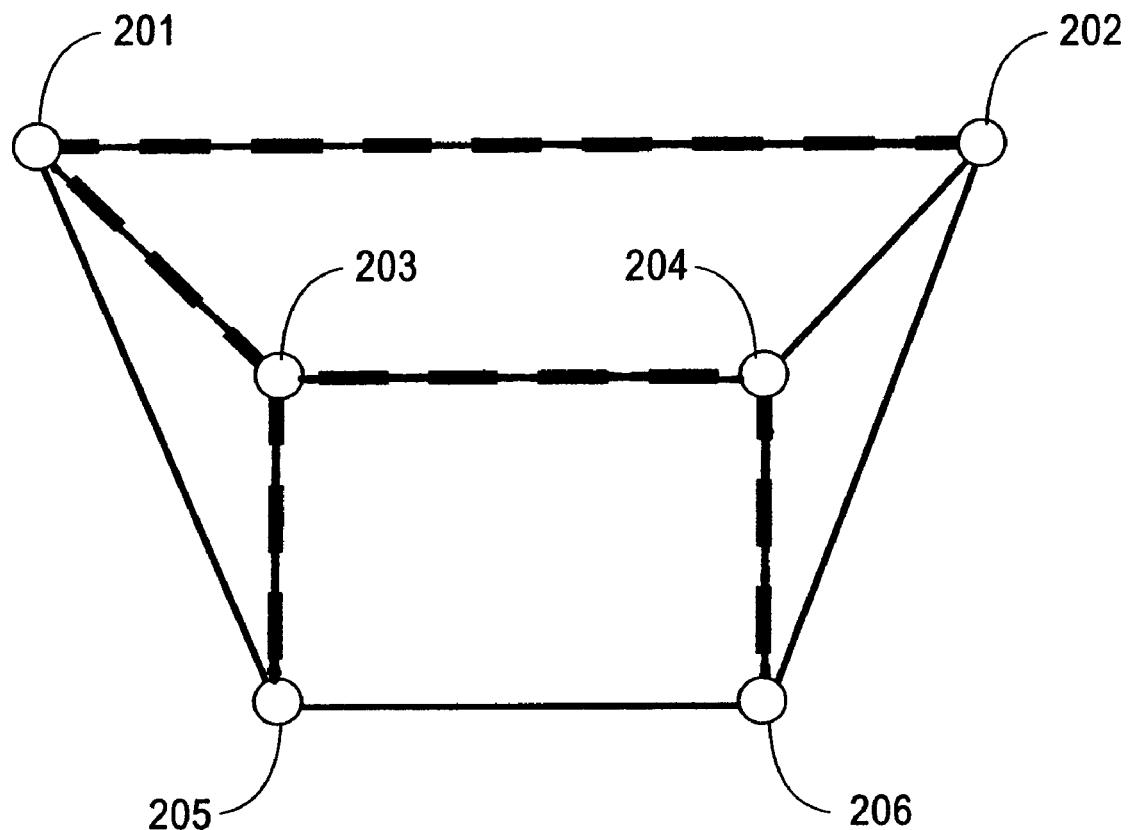
FIG. 2 illustrates the overlay and tree built by the algorithms in this invention.

Under the present invention, nodes are organized into an overlay network and multicast messages are disseminated both through an efficient tree embedded in the overlay and through gossips exchanged between overlay neighbors. FIG. 2 illustrates an overlay network, including nodes 201-206 and all overlay links there between, and an application-level multicast tree, including all nodes but only selected overlay links (hereinafter referred to as "tree links"), built on the overlay network by the algorithms of the invention. Once the overlay and the tree are in created for a network, the details of which will be described hereinafter with reference to FIGS. 6-12, the inventive message dissemination protocols for multicast and gossip messaging, detailed below with reference to FIGS. 3-5, can be implemented.

Under normal operations, multicast messages propagate rapidly through an efficient tree embedded in an overlay (FIG. 2). A tree link is, by definition, also an overlay link. Both overlay links and tree links are undirected and can propagate messages in either direction. Two nodes directly connected by an overlay link or a tree link are referred to as overlay neighbors or tree neighbors, respectively. While two tree neighbors are also overlay neighbors (e.g., nodes 201 and 203 of FIG. 2), not all overlay neighbors are tree neighbors (e.g., nodes 201 and 205). Solely for the purpose of maintenance, the tree conceptually has a root node, but any node can start a multicast without first sending the message to the root node. Each node in the tree maintains a list of tree neighbors as well as a list of its other overlay neighbors.

A multicast message propagates away from the message source along the tree links. With reference to FIG. 2, if node 204 wants to multicast a message to all nodes in the system, node 204 sends the message to its tree neighbors 203 and 206. Node 204 does not send the message to node 202, because 202 and 204 are not tree neighbors although they are overlay neighbors. Each node that receives the message immediately forwards the message to its tree neighbors, except the node from which the message arrived, as further detailed below with reference to FIG. 3. Each node remembers the IDs of the messages it has recently forwarded in order to avoid forwarding a message repeatedly.

Figure 3:
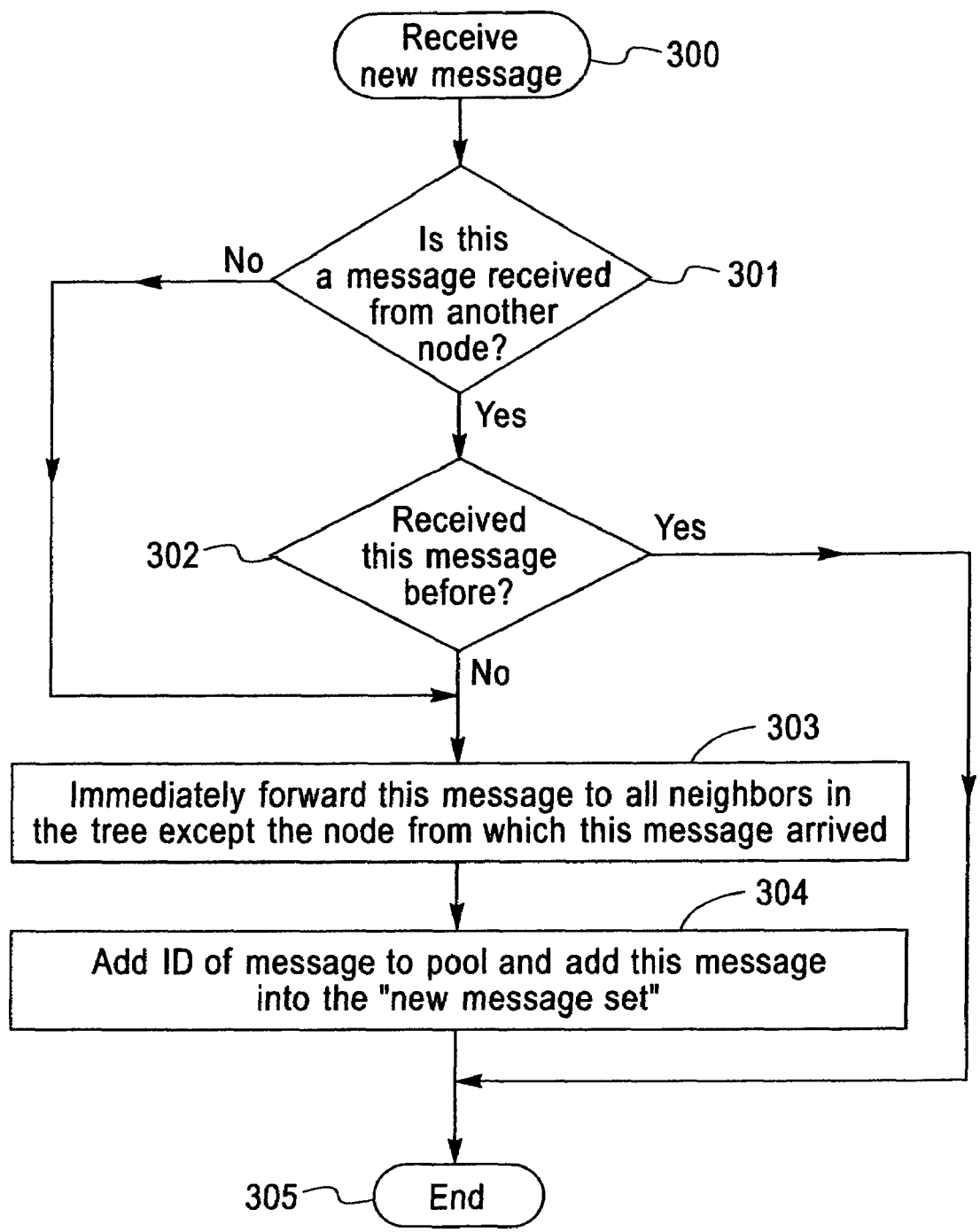
FIG. 3 shows a representative process flow for a node to process a multicast message in accordance with the present invention.

With specific reference to FIG. 3, a new message is received at step 300. The new message may be a message which has been generated locally by the node, or a message which has been newly received from a neighbor node. At decision box 301, the node determines whether the new message was received from another node or generated locally. If the new message was generated locally, a "no" determination, the process flow proceeds to step 303 and the new message is sent to all tree neighbors. If the message has been received from another node, a "yes" answer at 301, a determination is made at step 302 as to whether the message has been received before by comparing the ID of the incoming message with the saved IDs of multicast messages received in the recent past. If the incoming multicast message has been received before, no further action is needed, as this is a duplicate message. If the incoming multicast message has not been received before, the node immediately forwards this multicast message to all tree neighbors in the multicast tree 303, except the node from which this message arrived. The ID of this multicast message is then added into the pool of IDs of received multicast messages at step 304. The IDs of older multicast messages are purged from this pool periodically in order to control the size of this pool. This new multicast message is also added into the "new message set", which contains messages whose IDs have yet to be gossiped to the node's overlay neighbors.

Figure 4:
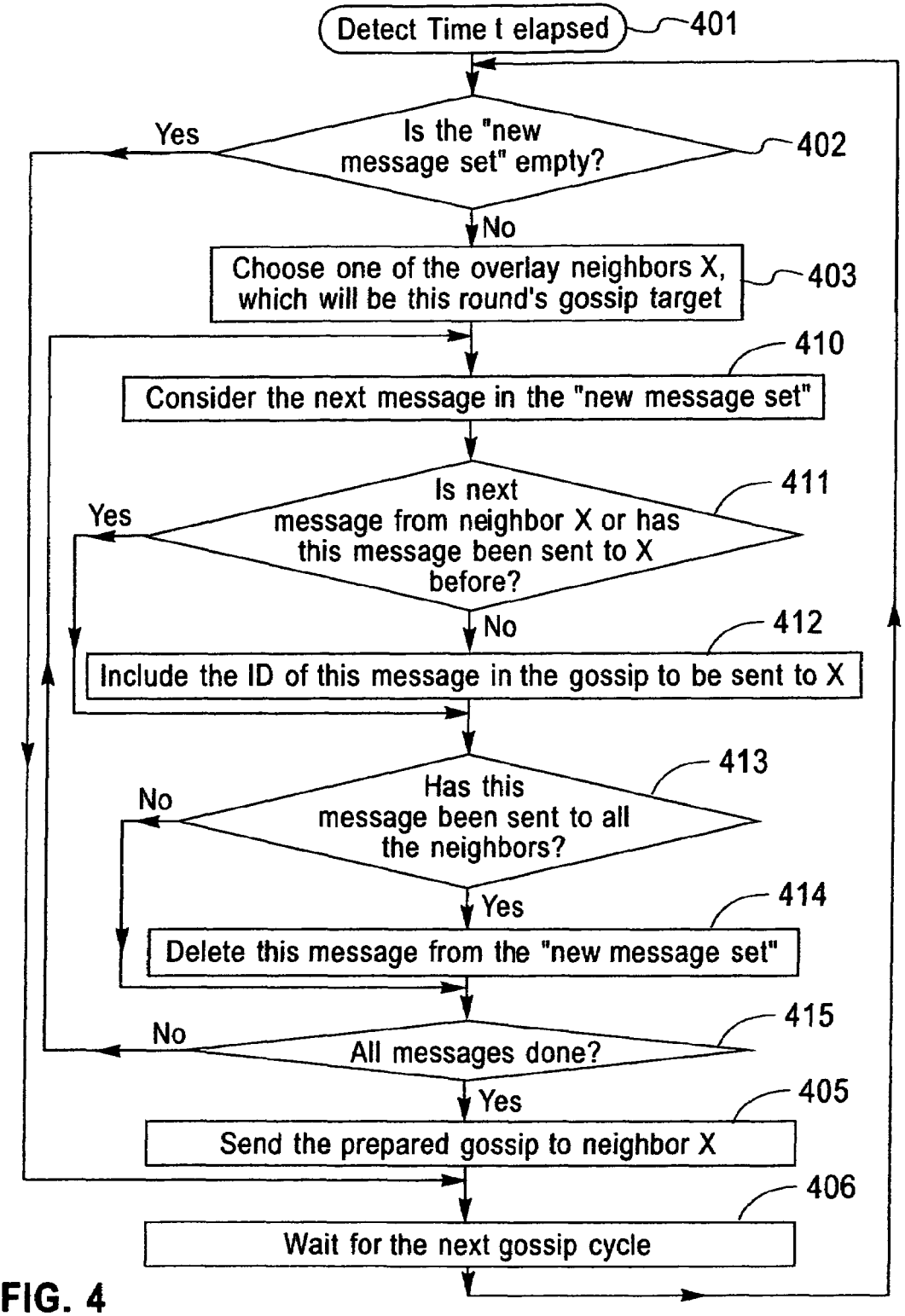
FIG. 4 illustrates a representative process flow for a node to process gossip messages in accordance with the present invention.

Assuming no node or links failures, the message sent by the foregoing tree-based multicast protocol will propagate rapidly to all nodes, with each node receiving the message exactly one time. Faults, however, are common. Therefore, the present invention uses a special gossip protocol to cope with failures. FIG. 4 illustrates the inventive gossip procedure executed by each node whereby nodes exchange message summaries with their overlay neighbors and pick up messages which they may have missed due to disruptions in the tree-based multicast. Each node maintains a list of its overlay neighbors, detailed below. Every t seconds, a node A chooses one of its overlay neighbors X, preferably in a round robin fashion, to which it will send a message summary (also called a "gossip"). The gossip period t is dynamically tunable according to the message rate. Each message injected into the system has a unique identifier (the aforementioned message ID). As an example, an identifier of a message injected by node P is a concatenation of node P's IP address and a monotonically increasing sequence number locally assigned by node P. The gossip that node A sends to node X includes the IDs of messages that node A has received or started since the last gossip that node A sent to node X, but excludes the IDs of messages that node A heard from node X. After receiving the gossip, if node X determines that the gossip contains the IDs of some messages that node X has not received, node X requests those messages from node A. In most cases, however, a message disseminates rapidly through the tree such that nodes receive the message from the tree before they receive gossips regarding the message from their overlay neighbors.

If node A has s overlay neighbors, it sends a gossip to a neighbor X every s*t seconds, where t is the gossip period. Because t is short and s is small, usually a gossip is exchanged between two overlay neighbors in no more than several seconds. A gossip can be saved if there is no multicast message during that period. The gossips are small, containing only the IDs of messages received in a short period of time. Node A gossips the ID of a message to each of its neighbors only once. After gossiping the message ID to the last neighbor, node A waits for a period b and then reclaims the memory for the message if A receives no further request for the message. The waiting period b should be at least a multiple of the maximum round trip time (RTT) between node A and its neighbors to allow sufficient time for the neighbors to request the message.

FIG. 4 provides a representative process flow for the gossip protocol in accordance with the present invention. When the gossip time period t elapses, such that it is time to send a gossip, at step 401, the sending, or gossiping, node first determines if the new message set is empty, at decision box 402. If the new message set is empty, such that no messages have been sent since the last gossip cycle, then the gossiping node waits for the next gossip cycle. The invention may be implemented to allow the gossiping node to send an "empty" gossip, indicating to all neighbors that they have not missed any messages, however, such may be an unnecessary use of network resources. If there are messages in the new message set, as determined in step 402, the gossiping node chooses one of its overlay neighbors, X, at step 403 as a gossip target. The gossip targets in different cycles are ideally chosen in a round-robin fashion, such that different overlay neighbors are chosen cyclically to receive gossips in different cycles. In each cycle, the gossiping node only sends one gossip to one overlay neighbor. Selecting the next message in the new message set, at step 410, the gossiping node determines at 411 if that next message is from the gossip target node X or if the message has been sent to neighbor node X before. If the message is from X or has been sent to X before, then the gossiping node determines, at step 413, if the message has been sent to all neighbors. If the message has been sent to all neighbors, the gossiping node deletes that message from the new message set at 414 and returns to step 410 to evaluate the next message in the new message set. When it is determined that a next message has not come from X and has not been sent to X before, the message ID for that message is added to the gossip to be sent to X, at step 412. As above, if the message has been sent to all other neighbors (and is now being sent to X), as determined at 413, the message can be deleted from the new message set at 414. The gossiping node next determines if all messages in the new message set have been evaluated, at step 415. If any message remain in the new message set, the gossiping node returns to step 410 to consider the next message as above. When all messages in the new message set have been considered, and all message IDs added to the gossip for neighbor X for any message in the new message set which have not either come from neighbor X or been already sent to neighbor X, then the prepared gossip is sent to neighbor X at 405 and the gossiping node waits for the next gossip cycle at 406. Throughout the waiting time, the gossiping node adds newly received messages to its new message set.

During some transient periods, the tree may be broken into fragments due to node or link failures. Among the tree fragments, messages propagate through gossips exchanged between overlay neighbors, such that; inside a tree fragment, messages propagate without stop through the remaining tree links that connect the fragment. With reference to FIG. 2, if node 202 starts a multicast for a message with IDm, node 202 would send the message to its tree neighbor 201. If node 201 fails before forwarding the message to its tree neighbor 203, the tree-based multicast would not deliver the message to nodes 203, 204, 205, and 206. However, if at some point, node 202 also sends a gossip to node 204 which includes IDm, node 204 would discover that it has not received the message and could consequently requests the message from node 202. Upon receiving the message, node 204 would immediately forward the message to its tree neighbors 203 and 206. Each receiver of the message would further immediately forward the message without stop along the remaining tree links that connect the tree fragment. In that way, the message will reach all of the nodes. In addition, due to the multiple propagation mechanisms, the broken tree will be repaired quickly, by a protocol described later, and messages will again purely propagate along the tree.

The procedures detailed with reference to FIGS. 3 and 4 work concurrently and complement each other. Multicast messages propagate both unconditionally through the tree and conditionally through gossips exchanged between overlay neighbors at the same time. There is a small chance that a node may receive a message through both channels (tree and gossip), redundantly. A node may receive a gossip containing the ID of a message that it has not received the message; obtain the message from the sender of the gossip; and, then later receive the message from a tree link. The chance for this to occur is very low, because messages typically propagate much faster through the efficient tree than through the gossip network.

The probability of receiving duplicate messages can be further reduced in two ways. First, if node X has already received or is receiving a multicast message discovered through a gossip while another node Y is trying to send node X the same message through a tree link, node X can abort the transmission with node Y immediately. In addition, when a node receives a gossip containing the ID of a message, it may delay requesting the message from the sender of the gossip for a predetermined threshold period of time, f. The threshold f is chosen to allow sufficient time for the message to first propagate through the tree. It is recommended that f be set to the 90th percentile delay for multicast messages to reach nodes through the tree. The foregoing optimization requires multicast messages and gossips to include the elapsed time since the message was injected into the system, which can be estimated by piggybacking and adding up the propagation delays and wait times as the message travels away from the source, or by the message being accompanied by the time at which it was first injected into the system.

Figure 5:
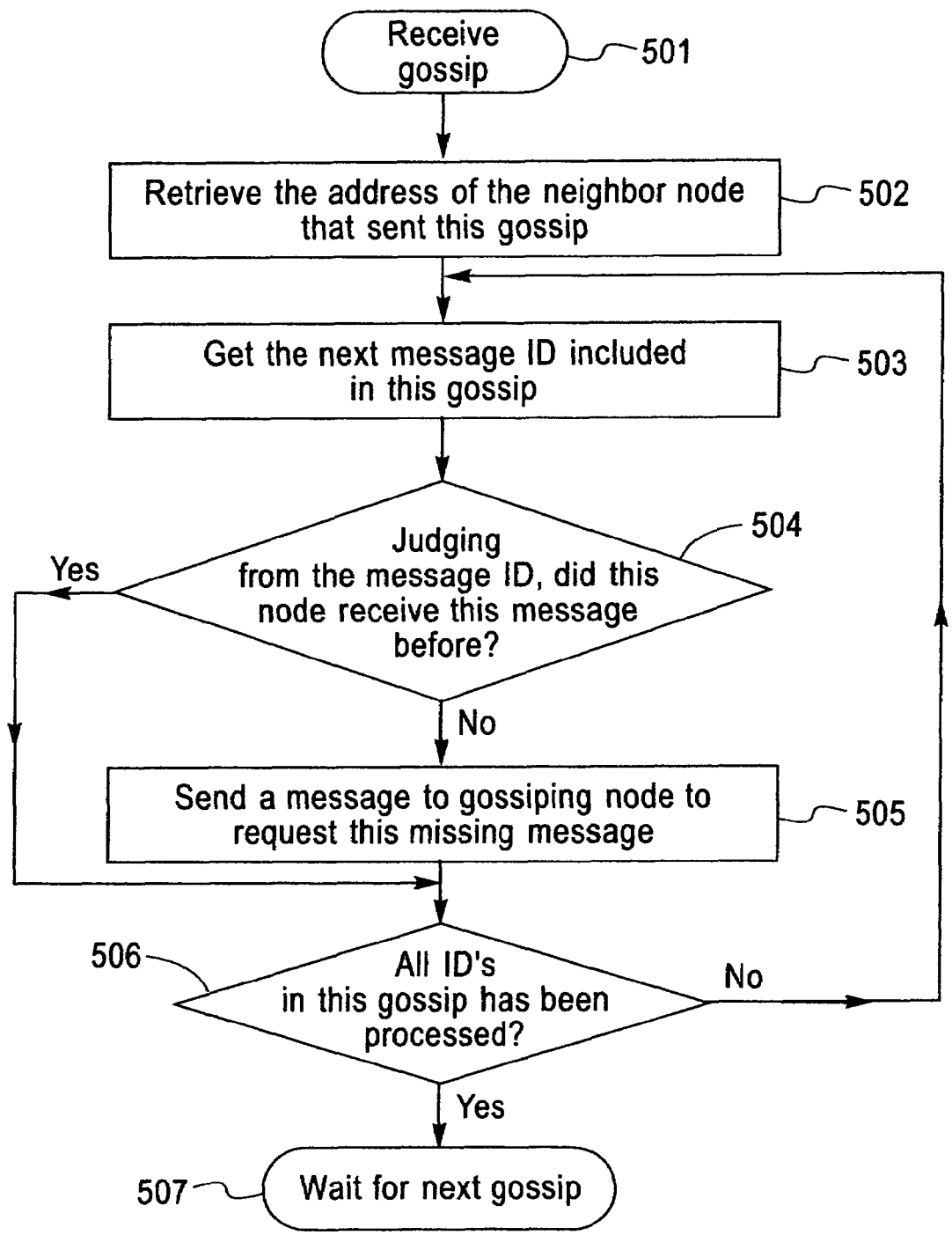
FIG. 5 illustrates a representative process flow for a node to process a received gossip message.

FIG. 5 details a process flow for a node that is on the receiving end of a gossip ("the receiving node"). At 501 the gossip is received at the receiving node. The receiving node retrieves the address of the neighbor node (i.e., the gossiping node) that sent the gossip at step 502. The gossip will include at least one message ID. At step 503, the receiving node selects a message ID from the gossip and determines, at step 504, if the receiving node has ever received a message with that message ID. If the receiving nodes has already received the message, it looks at the next message ID found in the gossip (i.e., returns to steps 503) until all message in the gossip have been processed, as determined in step 506. For any message that has not been previously been received at the receiving node, a "no" determination at step 504, the receiving node sends a message, at step 505, to the gossiping node requesting the missing message. Once all message IDs have been processed, as determined at step 506, the process flow ends, at 507, until a next gossip is detected at 501.

Figure 6:
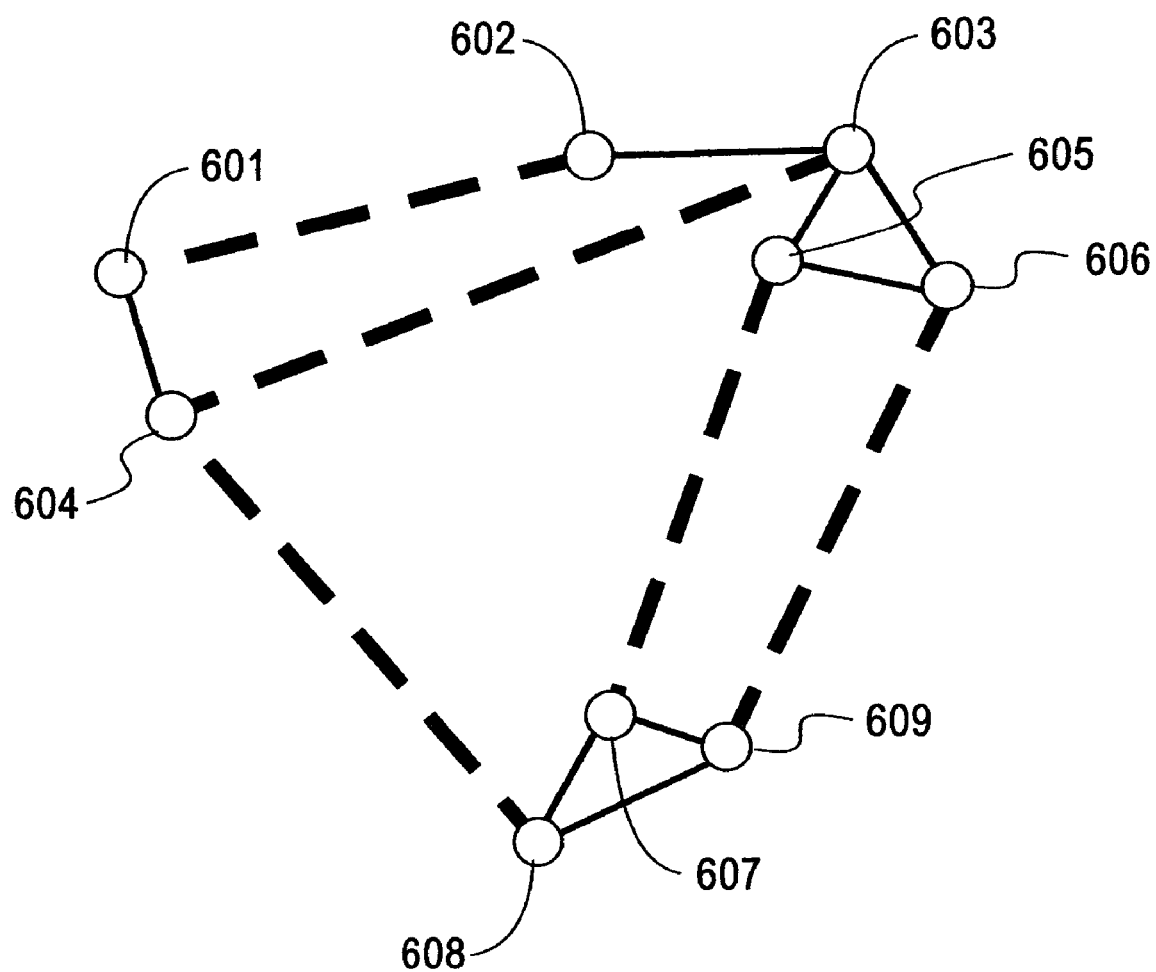
FIG. 6 illustrates an overlay network built by the algorithms in this invention, wherein the overlay network consists of both links between random nodes and links between neighbors selected based on network proximity.

FIG. 6 is a representative example of an overlay network built by the algorithms in accordance with the following detailed description. The overlay network consists of both links between random nodes (e.g. between 601 and 602, or 605 and 607) and links between neighbors selected based on network proximity (e.g. between 601 and 604, or 607 and 608). The overlay meets the previously described objectives in that the overlay is degree-constrained and richly connected, and consists of mostly low latency links. The overlay built by this protocol has several distinguishing features, including the feature that each node in the overlay built by this invention has roughly the same number of overlay neighbors, so as to spread out the maintenance overhead and the gossip overhead, in contrast to overlays built by existing protocols wherein node degrees are not tightly controlled. Another feature is that most nodes in the overlay built by this invention have exactly one random neighbor, while all other neighbors are chosen based on network proximity, in contrast to existing protocols wherein a node either has no random neighbor or chooses at least than half of its neighbors at random. This method produces overlays that are both efficient and robust. Once the overlay has been constructed, an efficient tree can be embedded in the overlay.

The structures of the overlay and the tree have major impacts on the efficiency and resilience of the multicast protocol. System parameters are chosen to strike a good balance between the conflicting goals of resilience and efficiency. The connectivity of the overlay (i.e., the number of disjoint paths between two nodes) directly affects the dependability of multicast message delivery in the face of node or link failures. Higher node degrees lead to better connectivity but introduce higher protocol overhead since nodes need to maintain more neighbors and to send gossips to more neighbors. Assuming nodes have similar capacities, it is desirable to have node degrees be as uniform as possible such that the protocol overhead imposed on each node is roughly equal. The overlay network constructed by the algorithms in this invention is unstructured, mandating no particular topology. Moreover, regardless of the initial structure of the overlay, the overlay is adapted automatically so that almost all nodes converge to a target node degree chosen at design time. If nodes have different capacities, their node degrees can also be tuned according to their capacities.

In addition to the target node degree, another important factor that impacts the quality of the overlay is the manner of selecting node neighbors, which affects the connectivity of the overlay, the message delay, and the stress on the underlying network links. On one hand, according to the random graph theory, adding links between random nodes improves the connectivity of the overlay. On the other hand, adding low latency links between nodes that are close in the physical network lowers message delay, consumes less network resources, and reduces stress on bottleneck network links. The present invention achieves a good balance by devoting a small number of overlay links to connect random nodes and selecting all other overlay links based on network proximity. This approach results in an overlay that has both low latency and high connectivity.

For the protocol, several designations are used. A component is defined as a group of nodes that are connected directly or indirectly by overlay links. Overlay links that connect randomly chosen neighbors are referred to as random links and overlay links chosen based on network proximity are referred to as nearby links. Two nodes directly connected by a random link are random neighbors and two nodes directly connected by a nearby link are nearby neighbors. Random degree Drand (X) and nearby degree Dnear (X) denote the number of node X's random neighbors and nearby neighbors, respectively. Cdegree, Crand, and Cnear denote the target node degree, target random degree, and target nearby degree, respectively, where Cdegree=Crand+Cnear. The values for Cdegree, Crand, and Cnear are constants chosen at design time, although, as further discussed below, the constants are tunable. Ideally, every node X has the same degree, Drand (X)=Crand and Dnear (X)=Cnear.

In one preferred embodiment of this invention, settings for the foregoing parameters are Crand=1 and Cnear=5. Without any random neighbor (Crand=0), the overlay may be partitioned even without any node or link failure. This is because nearby links do not connect remote components. With just one random neighbor per node (Crand=1), the connectivity of the overlay is almost as good as that of overlays using multiple random neighbors per node. Intuitively, nearby links connect nodes that are close and random links connect remote nodes. An example is a system consisting of 500 nodes in America and 500 nodes in Asia. Using only nearby links, the system would be decomposed into two components corresponding to the two geographical areas. Internally, each component is richly connected. By adding just one random link to each node (500 random links in total, with one link connecting two neighbors), an average of 250 random links would be expected to connect the America component and the Asia component, which would greatly enhance the connectivity of the entire system. Moreover, six neighbors per node provide sufficient connectivity. With this configuration, systems with thousands of nodes remain connected even if a massive number of nodes were to fail concurrently. The target node degrees Crand and Cnear are chosen at design time. The protocols that enforce the node degrees at run-time and select high-quality links for the overlay are detailed below. If is to be noted that the target node degrees can be represented as Crand+n and Cnear+n, where the value of n can be adjusted dynamically based on performance and/or past history.

Each node knows a random subset of nodes in the system (i.e., each node has so-called "partial membership"). This knowledge is maintained by piggybacking the IP addresses of some random nodes on gossips exchanged between overlay neighbors. When a new node N joins, it knows at least one node P already in the overlay through some out-of-band method. Node N contacts node P, as shown at step 702 of FIG. 6, to obtain P's member list S. Initially, node N accepts S as its member list. Later on, however, node N may add nodes into or delete nodes from S. Node N randomly selects Crand nodes in S as its random neighbors and establishes a TCP connection with each of them. All communications between overlay neighbors go through these established TCP connections. On the other hand, communications between nodes that are not overlay neighbors use UDP, (e.g., round trip transit (RTT) measurements between non-neighbor nodes.)

Among nodes in membership list S, ideally, node N should select those that have the lowest latencies to N as N's nearby neighbors. However, S can be large, including hundreds of nodes. It would introduce a large amount of traffic and long waiting time for N to measure RTTs to every node in S. Instead, node N preferably uses an algorithm to estimate network distance and chooses Cnear nodes in S that have the smallest estimated latencies to N as its initial set of nearby neighbors. Existing techniques such as triangular heuristic and GNP can be used to estimate latencies. During subsequent communications, node N will measures RTTs to nodes in S and switch from long latency links to low latency links, thereby improving the efficiency of the overlay over time.

If the new node N chooses a node X as its neighbor, N sends a request to node X. Node X accepts this request only if its node degrees are not too high. In the aforementioned preferred embodiment, the conditions are: for adding a random link, Drand (X)<Crand+5; and, for adding a nearby link Dnear (X)<Cnear+5. If the constraint is not met, node N has to try another node. For node X to accept node N as its nearby neighbor, it must also satisfy condition C2 (to be described later). Essentially, this condition stipulates that, if accepted, the link between nodes N and X must not be the worst overlay link that X maintains.

Figure 7:
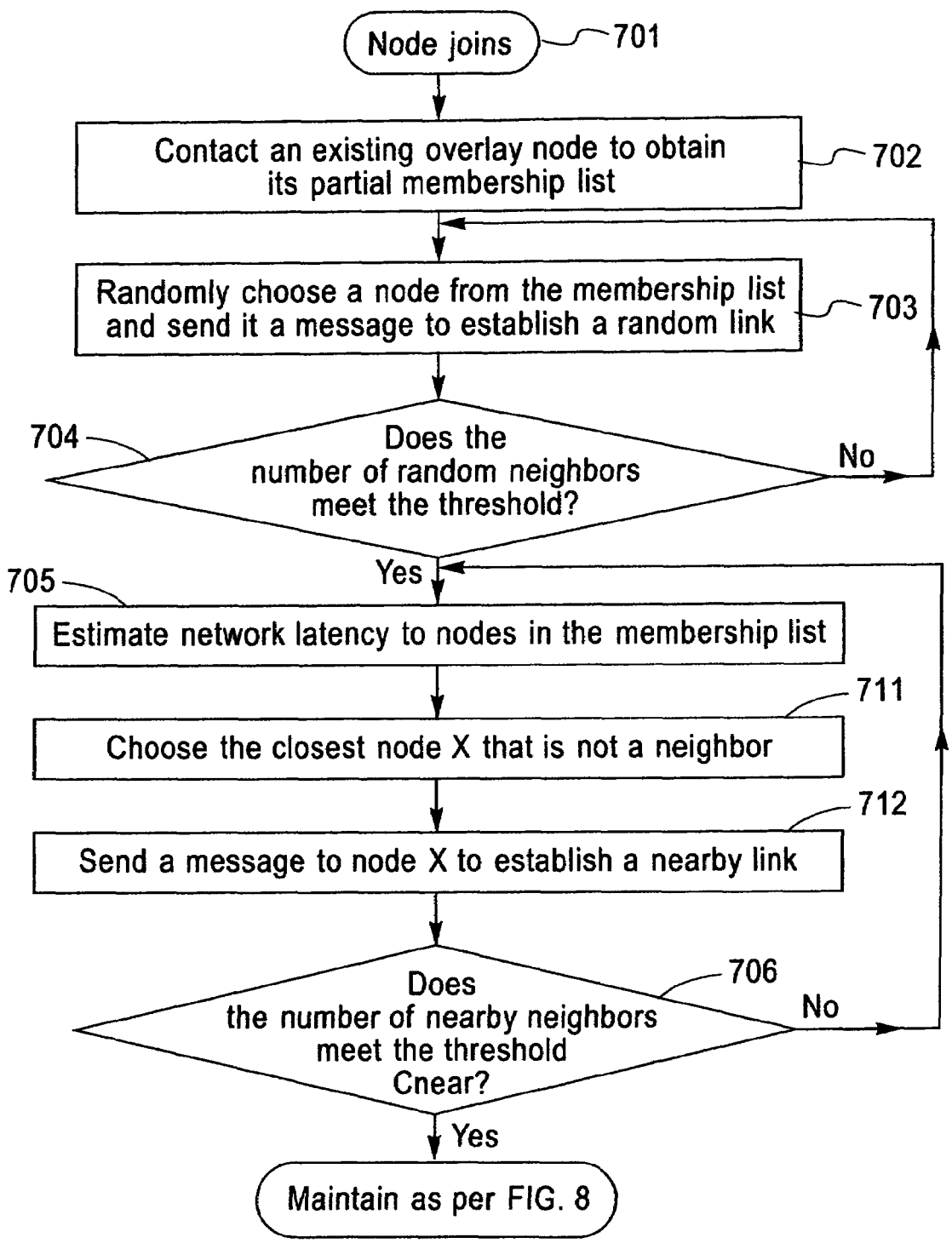
FIG. 7 shows a representative process flow for a node uses to join the overlay in accordance with the present invention.

FIG. 7 illustrates a detailed process flow of the node join protocol. When a new node joins 701, it first obtains the partial membership list maintained by existing node, at step 702. The joining node randomly chooses a node from the membership list and sends it a message to establish a random link, at 703. Until the number of random neighbors meets threshold Crand, as determined in step 704, the joining node repeats steps 703 and 704. The joining node them estimates the network latency to nodes in its partial membership list, at step 705, and chooses Cnear nodes that have short latency to itself as its nearby neighbors, sending message to the nearby nodes at 712, until Crand is reached at 706.

Figure 8:
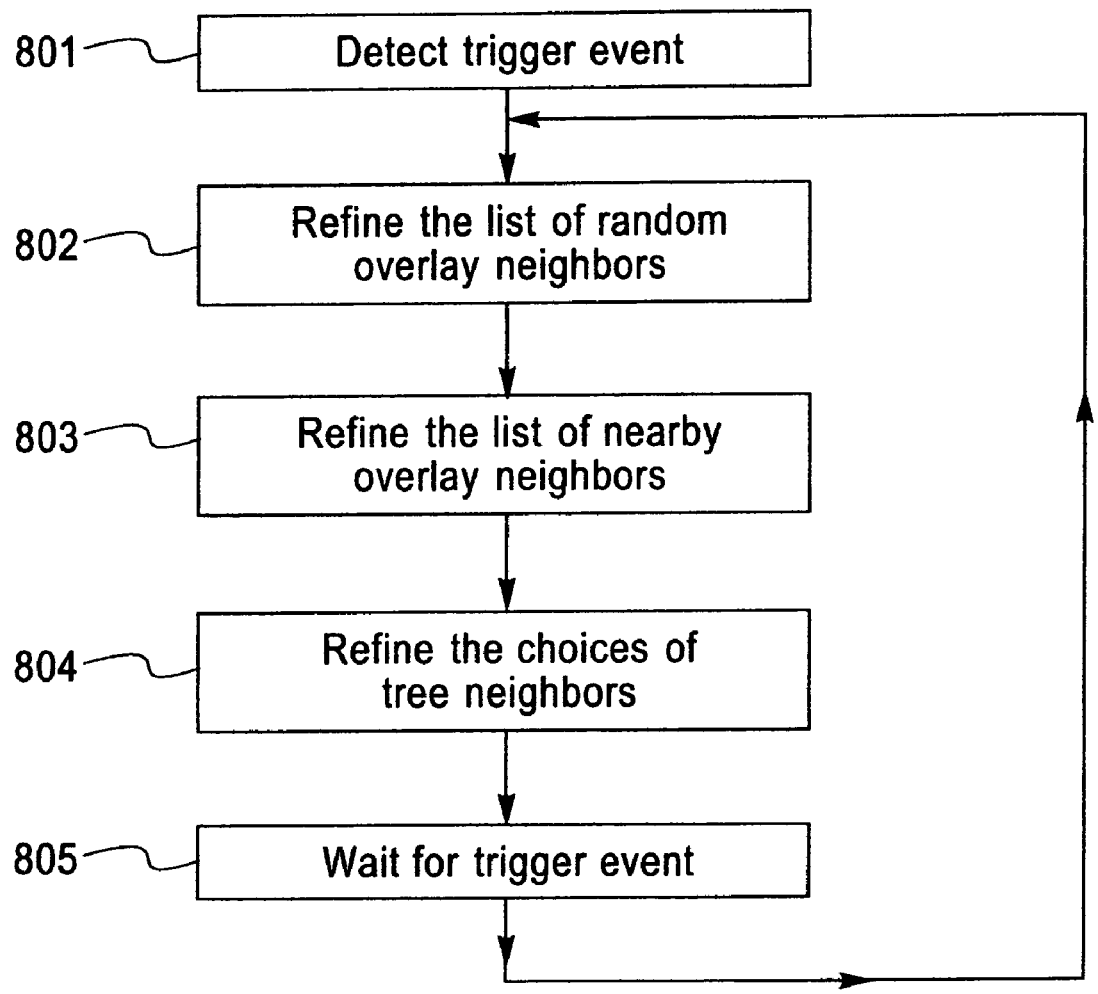
FIG. 8 illustrates a representative process flow for maintaining the overlay in accordance with the present invention.

This node join protocol guarantees that nodes do not have an excessive number of neighbors but it cannot ensure that node degrees Drand (X) and Dnear (X) eventually converge to the target degrees Crand and Cnear. The overlay and tree maintenance protocols described in the following sections achieve this goal and automatically handle node departures and failures. After a node leaves, its previous neighbors will choose other nodes as their new neighbors. As depicted in FIG. 8, the maintenance protocols comprise refining the list of random overlay neighbors, at 802, refining the list of nearby neighbors, at 803, refining the choices of tree neighbors, at 804, and, based on detection of a trigger event at 801, such as the expiration of a waiting period or notification of a node join or leave event, repeating the foregoing steps.

Figure 9:
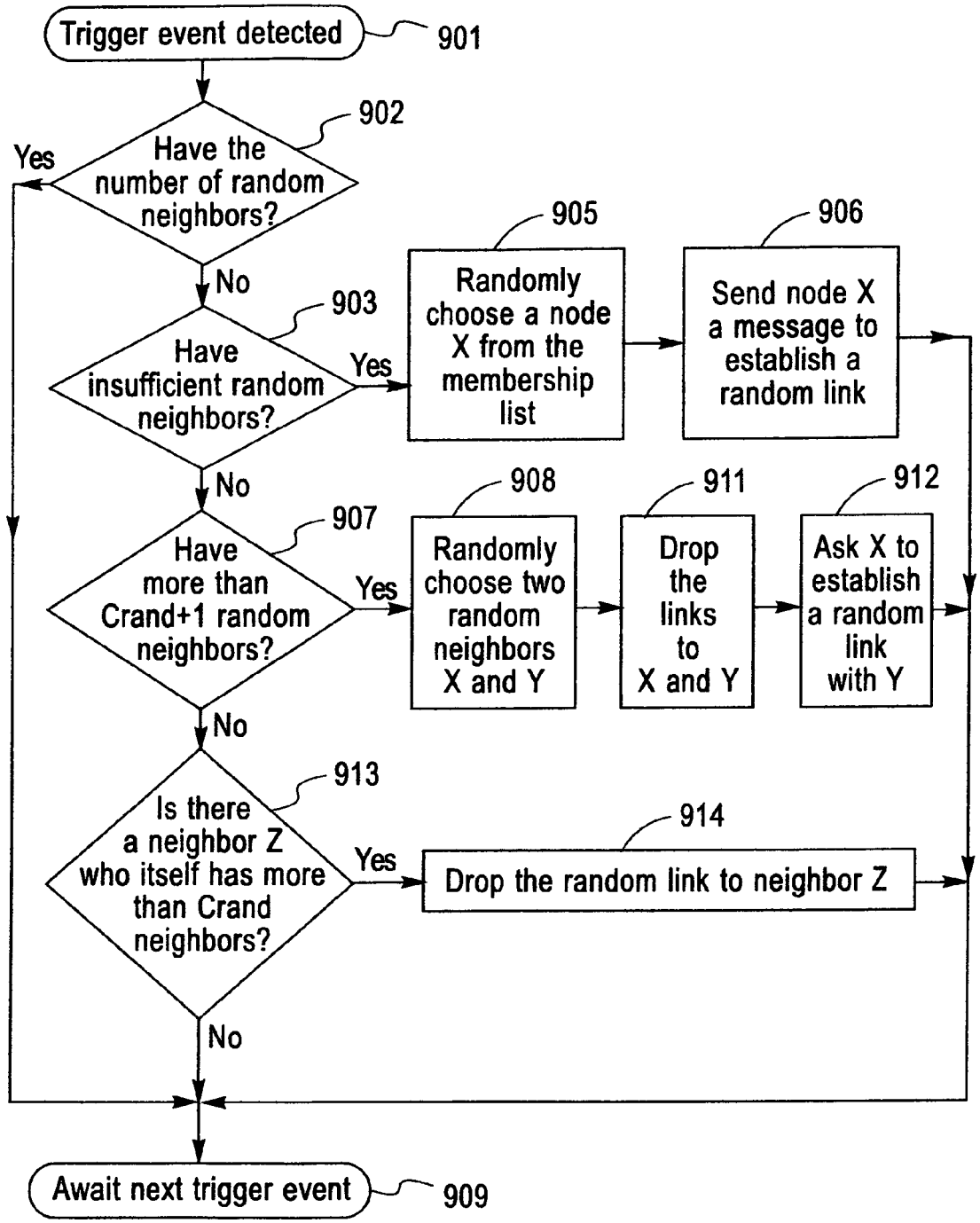
FIG. 9 shows a representative process flow for a node to maintain its random neighbors in accordance with the present invention.

FIG. 9 details the process flow for step 802 to maintain random neighbors. Periodically, every r seconds, each node X executes a protocol to maintain its random neighbors and a protocol to maintain its nearby neighbors, respectively. The period r is dynamically tunable according to the stability of the overlay (i.e., the need for maintenance). As noted above, it may also be triggered by a join or leave event. In one preferred embodiment, r=0.1. Although the period r is short, most of the time no operation is needed during maintenance. It is to be noted that the maintenance cost and gossip overhead at a node is independent of the size of the system.

If node X's random degree Drand (X) is equal to the target random degree Crand, no action is needed. If Drand (X)<Crand, which may occur due to, for instance, the failures of X's random neighbors, node X randomly selects a node from its member list and establishes a random link to the node. If Drand (X)>Crand, node X tries to drop some random neighbors through one of the operations R1 or R2. Under operation R1, if Drand (X) is greater than or equal to Crand+ 2, node X randomly chooses two of its random neighbors Y and Z and asks Y to establish a random link to Z. Node X then drops its random links to nodes Y and Z. By doing this, node X's random degree is reduced by two, while the random degrees of nodes Y and Z are not changed. Under operation R2, if one of node X's random neighbors W has more than Crand random neighbors, node X drops the random link between X and W. This reduces the random degrees of both X and W by one while still keeping their random degrees equal to or larger than Crand. If neither of the conditions above is met, node X's random degree must be Crand+1 and all X's random neighbors must have random degrees equal to or smaller than Crand. In this case, no action is taken and node X's random degree remains at Crand+1. It can be proven that, when the overlay stabilizes, each node eventually has either Crand or Crand+1 random neighbors.

FIG. 9 illustrates a representative process flow for a protocol that each node executes to maintain its random neighbors. This protocol is ideally executed periodically. The protocol starts at 901 by the detection of a trigger event (e.g., expiration of the time period; detection of a node joining or leaving; or a new neighbor message from a joining node). At 902, the node then checks if it has an ideal number of random neighbors, e.g., Crand. If so, no further action is needed and the node goes to step 909 to wait for the next trigger event. Otherwise, it checks if the node has too few random neighbors at 903. If so, it tries to add one more random link to a random node by choosing a node at 905 and sending the selected node a message to establish a link at 906. On the other hand, if the node has more than Crand+1 random neighbors, as determined at 907, it tries to drop some random neighbors at 908,911 and 912 using condition R1 described above. Otherwise if there is a neighbor who itself has more than Crand neighbors, as determined at 913, it uses condition R2 described above to drop the random link to the neighbor at 914.

In addition to maintaining its random neighbors, every r seconds, a node X also executes a protocol to maintain its nearby neighbors. The protocol differs from the protocol for maintaining random neighbors in that it considers network proximity when adding or dropping links. It tries to confine node X's nearby degree to either Cnear or Cnear+1, while choosing nodes that are as close to node X as X's nearby neighbors. Node X runs three subprotocols: one to replace X's long latency nearby links with low latency links; one to add more nearby links when Dnear (X) is too low, for instance, Dnear (X)<Cnear; and one to drop long latency nearby links when Dnear (X) is too high, for instance, Dnear (X) is greater than or equal to Cnear+2.

Node X sorts nodes in its member list S in increasing estimated latency. Starting from the node with the lowest estimated latency, node X measures real latencies to nodes in S one by one. During each maintenance cycle (every d seconds), node X measures RTT to only one node in S. As the overlay stabilizes, the opportunity for improvement diminishes. The maintenance cycle d can be increased accordingly to reduce maintenance overheads. Suppose node X measures RTT to node Q in the current maintenance cycle. In one preferred embodiment, Node X will add node Q as its new nearby neighbor and drop its existing nearby neighbor U if all of conditions C1, C2, C3, and C4 are met.

For condition C1, node X has at least one nearby neighbor U whose current nearby degree is not too low: Dnear (U) is greater than or equal to Cnear−1. Otherwise, the degrees of node X's all nearby neighbors are considered to be dangerously low. Dropping a link to one of them would endanger the connectivity of the overlay. Among node X's nearby neighbors that satisfy this condition, the node U to be replaced is chosen as the neighbor that has the longest latency to node X.

For condition C2, Dnear (Q) must be less than Cnear+n, where n is a predetermined number, 5 in one preferred embodiment. Essentially, this condition requires that the nearby degree of the new neighbor candidate Q is not too high.

For condition C3, if Dnear (Q) is greater than or equal to Cnear, then RTT(X, Q) being less than max_nearby_RTT(Q) must hold. Here RTT(X, Q) is the RTT between node X and the new neighbor candidate Q, and max_nearby_RTT(Q) is the maximum RTT between node Q and Q's nearby neighbors. If this condition is not met, node Q already has enough nearby neighbors and the link between nodes Q and X is even worse than the worst nearby link that Q currently has. Even if node X adds the link to node Q now, Q is likely to drop the link soon. Hence node X does not add this link.

Condition C4 requires that RTT(X, Q) is less than or equal to 0.5*RTT(X, U). Here node Q is the new neighbor candidate and node U is the neighbor to be replaced (selected by condition C1). Intended to avoid futile minor adaptations, this condition stipulates that node X adopts new neighbor Q only if Q is significantly better than the current neighbor U.

As one preferred embodiment, the conditions above are intended to resolve many conflicting goals, including upholding the connectivity of the overlay during adaptation, minimizing the total number of link changes without global information, and converging to a stable state quickly. For instance, condition C1 is a good example of the tradeoff that needs to be made. Because of condition C1, node U's nearby degree can be as low as Cnear−2 in a transient period after node X drops the link to U and before U adds more nearby links in the next maintenance cycle. This lower degree bound can be increased to Cnear−1 if condition C1 is changed from Dnear (U) being greater than or equal to Cnear−1 to Dnear (U) being greater than or equal to Cnear. However, this change could produce an overlay whose link latencies are dramatically higher than that produced by the preferred embodiment, because fewer neighbors satisfy this new condition to qualify as a candidate to be replaced. With the settings in one preferred embodiment being Crand=1 and Cnear=5, the lower bound of a node's degree during adaptation is 4, which is sufficiently high to uphold the connectivity of the overlay during short transient periods.

Originally, node X sorts nodes in its member list S in increasing estimated latency and measures RTTs to them one by one. Once all nodes in S have been measured, the estimated latencies are no longer used. But node X still continuously tries to replace its current nearby neighbors by considering candidate nodes in S in a round robin fashion. The hope is that some nodes that previously did not satisfy some of the conditions C1-C4 now can meet all of them and hence can be used as new nearby neighbors.

If node X has fewer than Cnear nearby neighbors, X needs to add more nearby neighbors in order to uphold the connectivity of the overlay. In one preferred embodiment, to spread out the load, during each maintenance cycle, node X adds at most one new nearby neighbor. In a process which is similar to the process used to replace nearby neighbors, node X selects a node Q from its member list S in a round robin fashion and adds Q as its new nearby neighbor if both conditions C1 and C2 are met. These conditions stipulate that node Q does not have an excessive number of neighbors and that the link between nodes X and Q is no worse than the worst nearby link that Q currently has.

If node X has an excessive number of nearby neighbors (e.g., some new nodes have added links to X), node X starts to drop some nearby neighbors to reduce unnecessary protocol overheads. In one preferred embodiment, although the target nearby degree is Cnear, node X starts to drop nearby neighbors only if Dnear (X) is greater than or equal to Cnear+2. This allows a node's nearby degree to stabilize at either Cnear or Cnear+1. One alternative is to drop one more nearby neighbor when Dnear (X)=Cnear+1, but this aggressive approach may increase the number of link changes and it may, therefore, take longer to stabilize the overlay. When Dnear (X) is greater than or equal to Cnear+2, node X tries to drop Dnear (X)−Cnear nearby neighbors. The candidate neighbors to drop are those that satisfy condition C1 above, i.e., nodes U whose nearby degree is not dangerously low, such that Dnear (U) is greater than or equal to Cnear−1. Again, avoiding dropping links to low degree nodes helps uphold the connectivity of the overlay during adaptation. Node X sorts its nearby neighbors that satisfy this condition and drops those that have the longest latencies to node X until node X's nearby degree is reduced to Cnear or until no nearby neighbor satisfies condition C1.

Figure 10:
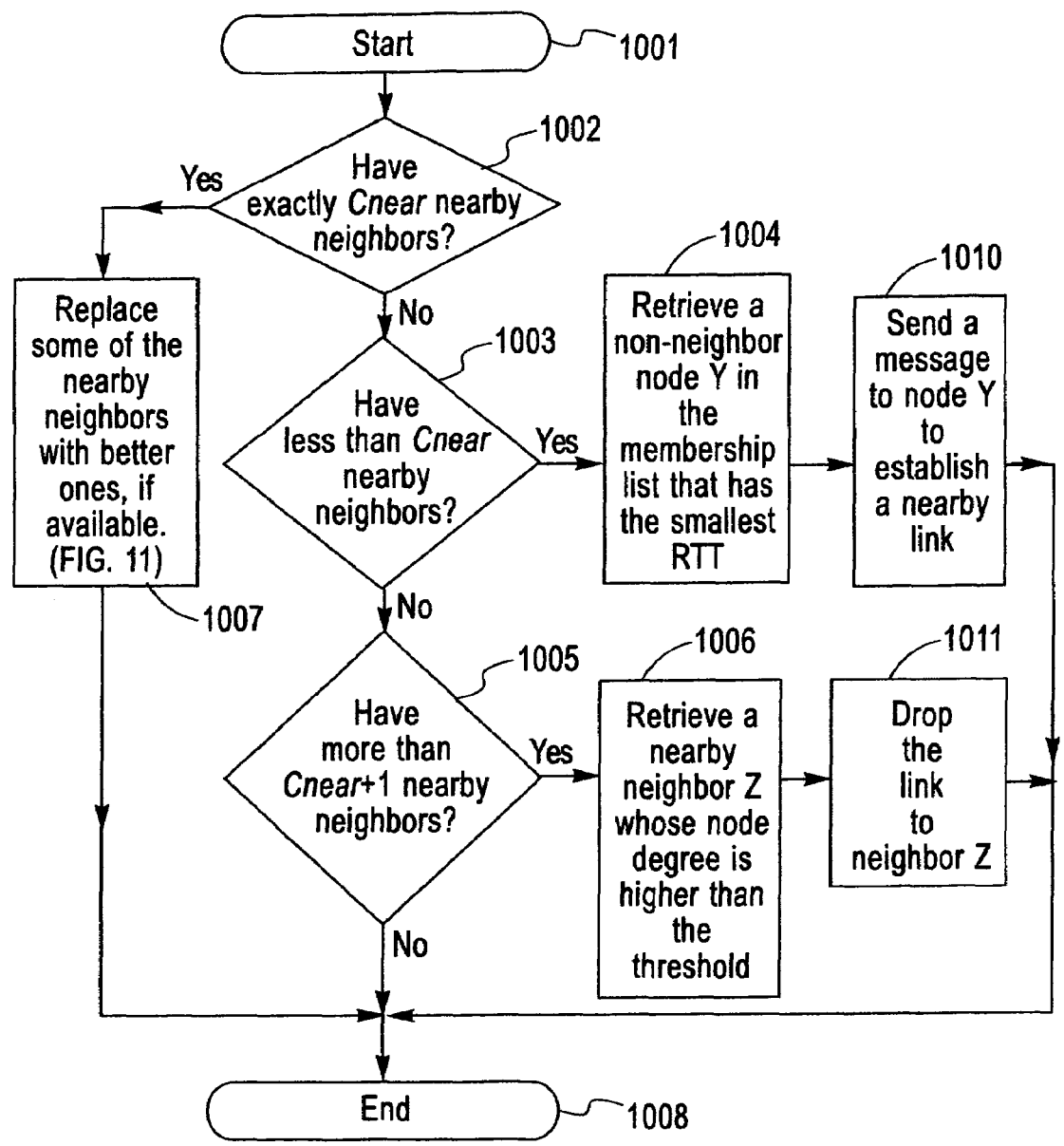
FIG. 10 illustrates a representative process flow for a node to maintain its proximity-aware neighbors in accordance with the present invention.

FIG. 10 is the high-level process flow of the protocol that each node executes to maintain its nearby neighbors. This protocol is executed periodically. At expiration of a time period, at 1001, the node checks if it has the right number of nearby neighbors at 1002. If so, it executes the protocol in FIG. 11, at 1007, to improve the quality of its current nearby links by selecting better nearby neighbors. On the other hand, if the node has too few nearby neighbors as determined at 1003, it tries to add one more nearby link to a node that is close to this node in network distance by retrieving the node Y from the membership list at 1004 and sending a message to node Y to establish a nearby link therewith. If the node has too many nearby links as determined at 1005 using Cnear+n, where n is predetermined, the node identifies a nearby node that has long network latency to this node and has a sufficient number of neighbors, at step 1006 and then drops the link to the node at 1011. This concludes the periodic execution and the time period is reset at 1009.

Figure 11:
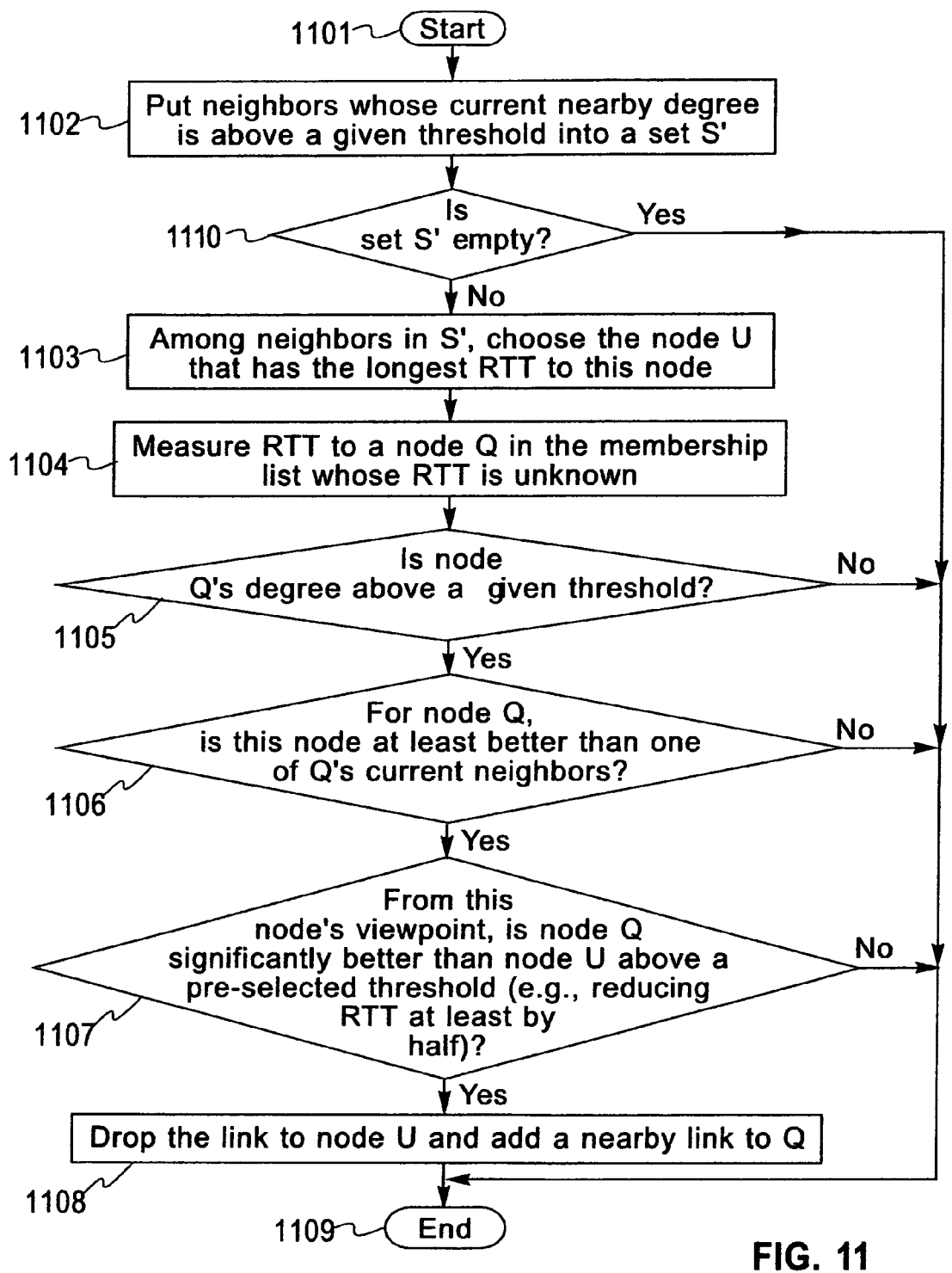
FIG. 11 is a representative process flow for a node to evaluate and replace proximity-aware neighbors in accordance with the present invention.

FIG. 11 illustrates the high-level process flow for a node to execute in order to improve select better nearby neighbors when the node already has the right number of nearby neighbors. The node tries to replace a long-distance nearby neighbor with a closer one. While doing so, it tries not to endanger the connectivity of the overlay by not dropping links to nodes with low node degree. The process starts at 1101, for example with the expiration of a time period, after which the node selects a node U from its neighbors that has the longest RTT to this node at step 1102. The selection may be made by comparison of the RTT of each node to a threshold, after which any nodes which have RTTs that exceed the threshold are placed in set S'. If no RTTs exceed the threshold, such that set S' is empty as determined at step 1110, the process flow terminates and the node waits for the next period, at 1109. If, however, one or more nodes exist for which the RTT is above a threshold, at step 1103, the node chooses the node U in set S' that as the longest RTT. At step 1104, the RTT to node Q from the membership list, whose RTT is unknown, is measured. If node Q's degree is not too high, as determined at 1105, and if for node Q the node is least better than one of Q's current neighbors, as determined at 1106, and if from this nodes viewpoint node Q is significantly better than node U as determined at 1107, then the link from node U is dropped and a nearby link to Q is added at step 1108. This concludes the process and the timing period is reset at 1109.

This invention selects overlay links in a decentralized fashion to construct an efficient tree embedded in the overlay. The tree spans over all nodes and propagates messages rapidly. There are many choices for the algorithm to build the tree on top of the overlay. In one preferred embodiment, this invention uses an enhanced version of the classical Distance Vector Multicast Routing Protocol (DVMRP). It is to be noted, thought, that this invention only needs a single tree. The tree conceptually has a root and the tree links are overlay links on the shortest paths (in terms of latency) between the root and all other nodes. If the root fails, one of its neighbors will take over its role. Initially, the first node in the overlay acts as the root. Periodically, the root floods a heartbeat message throughout every link in the overlay to help detect failures (e.g., partitioning) of the overlay and the tree.

Each node X in the overlay maintains a tuple <cost(X), parent(X)>, where cost(X) is the latency for X to reach the root through a tree path, and parent(X) is node X's parent in the tree. Whenever node X adds or drops an overlay link, it recalculates the minimal cost to reach the root by going through one of its overlay neighbors. Suppose node Y is an overlay neighbor of node X and the cost for Y to reach the root through a tree path is cost(Y). The cost for node X to reach the root by going through node Y is cost(X)=cost(Y)+0.5*RTT (X, Y). Among all overlay neighbors of node X, X selects as its parent the node P that leads to the smallest cost for X, setting parent(X)=P and cost(X)=cost(P)+0.5*RTT(X, P).

Among links in the overlay, this protocol tends to include low latency links in the tree. In addition to its parent in the tree, a node X also knows its children in the tree, namely node X's overlay neighbors that select X as parents. This protocol is decentralized, such that no node maintains a global map of the entire system. All information that a node uses to maintain the overlay or the tree can be obtained either locally or from its overlay neighbors. To address the "count to infinity problem", which may cause loops in the tree during adaptation, each node knows its ancestors in the tree, (i.e., nodes on the path to the root). When node X selects a node Y as its parent, X obtains Y's path to the root and appends Y at the end. When node X tries to select node Z as its parent but Z determines that X is actually an ancestor of Z according to Z's knowledge, Z informs X of this error. Node X sets cost(X) to infinity and parent(X) to NIL, meaning that X does not know how to reach the root. Correct paths to reach the root will quickly propagate in the overlay and node X will find a new path to the root. When the cost of the path to the root changes, node X notifies its overlay neighbors, which may accordingly change their selection of parents and their cost and path to the root.

Periodically, every m seconds, the root node generates a "root message" and sends the message to each of its overlay neighbors. Upon receiving a root message, a node immediately forwards the message to each of its overlay neighbors except the node from which the message arrived. A root message floods over every link in the overlay. A node may receive a root message multiple times. Each node remembers the root messages it forwarded lately to avoid forwarding the same root message repeatedly.

Root messages are important for both tree maintenance and overlay maintenance. The root messages fix all transient errors in the tree by redefining the tree structure. When a root message floods in the overlay, node X's parent in the tree is reset to the node Y from which X receives the message first, because Y is on the fastest path to the root. When the overlay is stable, the parent-child relationship defined by the root message is exactly the same as that defined by the basic tree adaptation protocol that selects parents based on cost(X). In addition, root messages help detect partitioning of the overlay. Normally, nodes expect to receive a root message roughly every m seconds very reliably because root messages propagate through redundant paths. If node X does not receive any root message for 3*m seconds, X assumes that it now resides in a partition that is disconnected from the root. With a certain probability p, node X establishes a random link with a node in its partial member list, hoping to rejoin the partition where the root resides. The probability p is to avoid having too many nodes in the disconnected partition to initiate new connections simultaneously. Root messages also help to detect node and link failures. Existing overlay or tree protocols typically use heartbeat messages between neighbors to detect node or link failures. Root messages serve this purpose as well and root messages do not actually introduce extra overhead compared with existing protocols. The invention just uses the maintenance traffic a different way. As taught above, all communications between overlay neighbors go through pre-established TCP connections. Suppose nodes X and Y are neighbors, then if node Y is down, node X keeps forwarding root messages to Y until the TCP layer on node X returns an error to the application layer. The error message would be sent when TCP tries to forward a root message to node Y, because TCP times out while waiting for the acknowledgments for previous root messages. Node X then deletes the link to node Y, which may result in adding another link later. If both nodes X and Y are operational but the route between them is broken, both nodes detect this failure and delete the link between them.

The tree improves efficiency and reduces multicast message delay but is not mandatory for reliable message dissemination. The root of the tree has no particular significance. If the root is down, its neighbors detect this failure through the lack of root messages and then run a distributed election algorithm to select a new root among them, which is relatively simple because the root only has a small number of neighbors. In one preferred embodiment, a simple bully algorithm can be adopted and the node with the largest IP address wins. The new root then immediately floods a new root message over every link in the overlay to redefine the structure of the tree. Root messages are versioned. When a node X sees a new root message, X uses it to updates parent(X) and cost(X). The invention exploits node proximity in the network and adapts the overlay and the tree according to measured RTTs. To avoid unnecessary adaptations caused by fluctuation in RTT, the invention preferably measures the RTT between two nodes multiple times and uses the smallest one as the base RTT to guide adaptation. The smallest RTT has been shown to be quite stable by previous measurement studies. Once a base RTT is obtained, it is updated conservatively even if new RTTs are lower, since, for a large system, stability may be more important than performance. Similarly, root messages redefine the structure of the tree conservatively. In the basic protocol, when a root message floods in the overlay, node X's parent in the tree is set to the node Y from which X receives the message first. In the revised protocol, if node Y is not node X's current parent, X resets its parent to Y only if root messages first arrives from Y several times in a row.

In the preferred embodiments above, this invention uses network latency to guide the adaptation of the tree and the overlay. Other metrics can also be incorporated, for instance, hop counts returned by the trace-route tool, packet loss rate, available bandwidth, and node capability. The hop count metric may be desirable because it is simple and more stable than network latency, since the load in a multicast tree is unbalanced due to internal nodes often carrying higher traffic. In another preferred embodiment, one can build multiple trees with different roots embedded in a single overlay. Different multicast messages can randomly choose a tree to use or a big message can be divided into segments and each segment propagated through a different tree.

Figure 12:
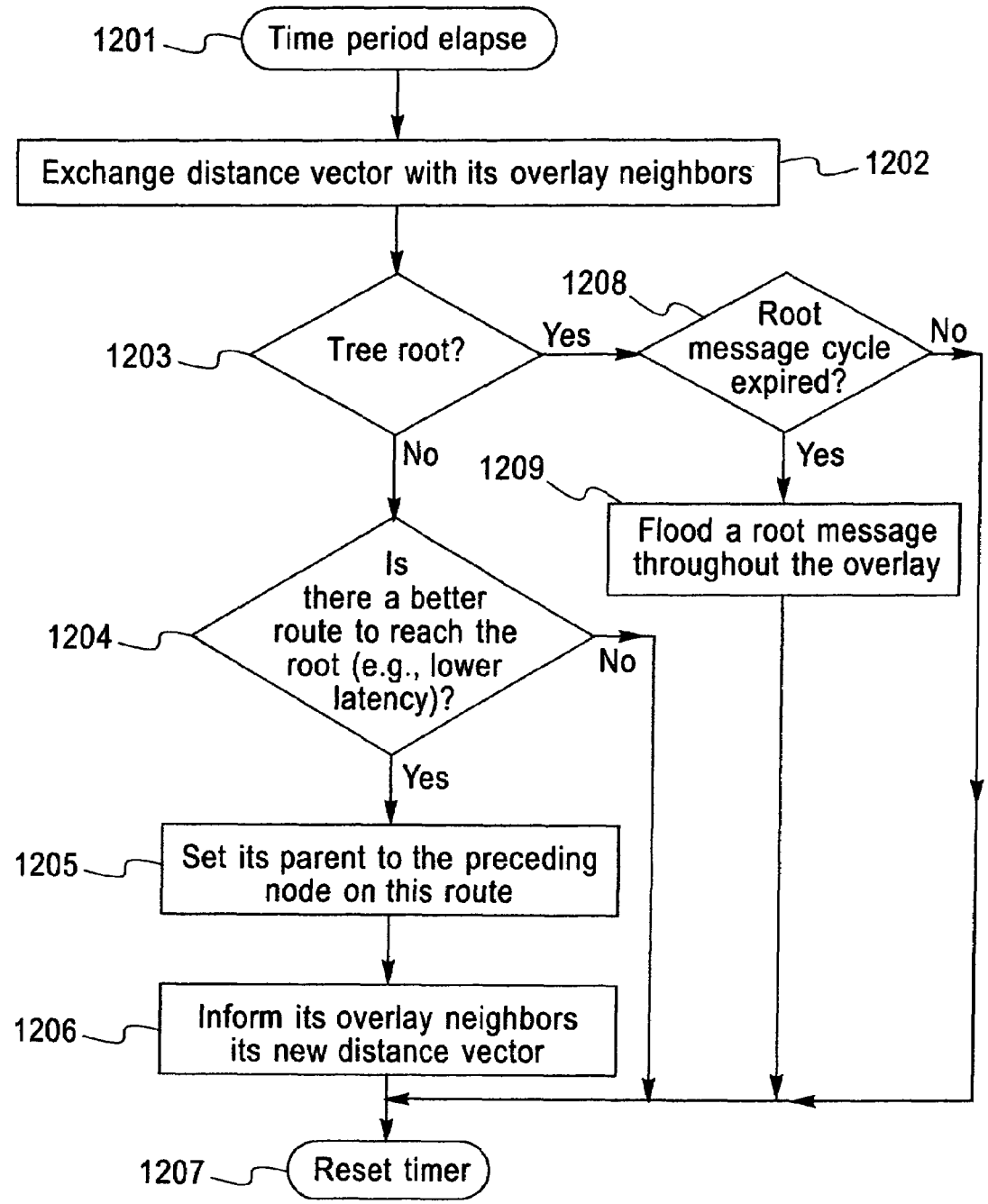
FIG. 12 illustrates a representative process flow for maintenance of the multicast tree embedded in the overlay in accordance with the present invention.

FIG. 12 is the high-level process flow illustrating one preferred embodiment of the protocol that maintains the multicast tree embedded in the overlay. This protocol is executed periodically as well as on demand. It is a variant of the DVMRP protocol. The algorithm starts at 1201 and a node exchanging distance vector information with its neighbors at 1202. If the node is the root of the tree, as determined at 1203, it functions differently from other nodes in the system. Periodically if a timer has expired as determined at 1208, the root floods a root message in the overlay at 1209, which helps fix transient errors, network partitioning, and link/node failures. Otherwise, if the node is not a root of a tree, it is determines at 1204 if there is a better route to reach the root. Each node periodically exchanges its cost to reach the root with its overlay neighbors and that information is used in the determination. At 1205, the node sets its parent to the preceding node on the better route and then notifies its overlay neighbors at 1206. The process terminates and time period is reset at 1207.

In the foregoing description, it has been shown that a complex network can be managed in a decentralized manner by nodes of the network establishing a network overlay and notifying neighbor nodes of the overlay and of a multicast tree embedded in the network. Nodes identify tree neighbors as well as other overlay neighbors. Message dissemination in the network is accomplished through multicasting messages from a node to its tree neighbors and by the node sending periodic gossips containing message IDs to overlay neighbors. Each node continually refines its collection of overlay neighbors, refines its collection of tree neighbors, forwards multicast messages over the tree, sends gossips to overlay neighbors, and retrieves missing multicast messages discovered from received gossips. Node or link failures within the network are readily identified and compensated for the by invention. While the invention has been described with reference to several preferred embodiments, it is to be understood that modifications may be made without departing from the spirit and scope of the invention as set forth in the appended claims.

Having thus described the invention, it is now claimed:

1. A method for nodes in a network, comprising a plurality of computer nodes connected through a plurality of network devices, to create a logical network overlay of said network comprising the steps of:
   each of said nodes creating an overlay section by the steps of:
      selecting a first set of nodes as nearby neighbor nodes;
      selecting a second set of nodes at random as random neighbors;
      sending a first plurality of messages, one message to each node of said first and said second set of nodes requesting establishment of a link to each of said nodes;
      receiving a second plurality of messages from each of said nodes; comprising link acceptances or link rejections; and
      establishing links with nodes sending link acceptance messages;
      wherein, each node has a predetermined threshold number for nearby neighbors and a predetermined threshold number for random neighbors and whereby link acceptance is based on at least one of said threshold numbers and performance metrics; and
      constructing a multicast tree for multicasting message in said overlay, wherein said constructing a multicast tree comprises applying a distance vector multicast routing (DVMRP) protocol to said overlay;
   one node of said overlay periodically sending at least one root message along said tree, thereby notifying nodes of said network of a tree structure; and
   each node identifying a plurality of neighbor nodes comprising at least one tree neighbor logically connected to said each node by a tree link and at least one overlay neighbor logically connected to said node by an overlay link that is not a tree link;
   upon detection of a message at said each node, said each node determining if a particular message was sent from one of said at least one of said tree neighbors;
   if said particular message was sent from one of said at least one of said tree neighbors, omitting the message ID for said particular message from a gossip to be sent to said one of said at least one tree neighbors;
   if said particular message was not sent from one of said at least one tree neighbors, multicasting each said message to the at least one tree neighbor and saving a message ID for each said multicast message; and
   said each node periodically sending a gossip comprising the message ID for each said multicast message to said at least one overlay neighbor wherein said each node selects a different overlay neighbor to be said at least one overlay neighbor to receive each successive gossip in a round robin manner.

2. The method of claim 1, further comprising the steps of:
   said each node receiving a message request from a requesting overlay neighbor, said message request comprising at least one message ID from said gossip; and
   said each node sending the at least one message represented by that at least one message ID to said requesting overlay neighbor.

3. The method of claim 1 wherein said each node adjusts at least one of a period for sending a gossip and an amount of message ID content of a gossip based on network conditions.

4. The method of claim 2 further comprising said each node delaying sending the at least one message represented by said at least one message ID for a predetermined period of time based on observed performance and workload in the network.

* * * * *